Patented June 23, 1953

UNITED STATES PATENT OFFICE 2,643,264

METHOD FOR SYNTHESIZING 4,4' BIPHENYL DIISOCYANATE

Ernest E. Fauser, Cuyahoga Falls, Ohio, assignor to Wingfoot Corporation, Akron, Ohio, a corporation of Delaware No Drawing. Application December 29, 1949, Serial No. 135,849

9 Claims. (Cl. 260—453)

This invention relates to a method for the conversion of benzidine to 4,4' biphenyl diisocyanate.

The formation of 4,4' biphenyl diisocyanate from benzidine and phosgene is thought to take place according to the following equations:

(1)
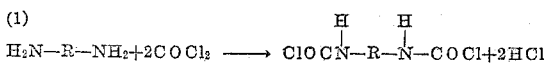

(2)
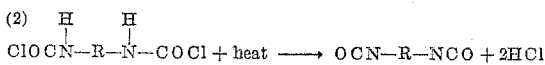

wherein R is a biphenyl or xenyl radical. The principal side reaction is the formation of the urea which may be polymeric in the case of difunctional diisocyanates.

(3)
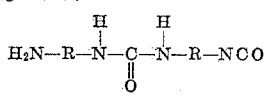

In order to convert the amine to the isocyanate with resulting high yields of uncontaminated isocyanate, the amine group must be inactivated before the isocyanate groups are released.

In the preparation of xenyl or 4,4' biphenyl diisocyanate from benzidine and phosgene, difficulty is encountered in obtaining good yields for the reason that the diisocyanate, once formed, tends to react with additional benzidine to form an unwanted urea compound, as is shown in Equation 3 above.

Since heat promotes the main reaction (Equation 2 above) and by so doing permits the formation of the urea according to Equation 3 if any unconverted benzidine is present in the reacting mixture at the time, it has not heretofore been possible to obtain xenyl diisocyanate in high yields. The problem is further complicated by the fact that the reaction between the benzidine and phosgene is exothermic.

One object of the invention is to provide an economical and commercially feasible method of producing 4,4' biphenyl diisocyanate in high yields. Another object is to provide a method for producing 4,4' biphenyl diisocyanate in a high state of purity. Other objects and advantages will appear as the description proceeds.

According to the practice of this invention, the benzidine is dissolved in an inert solvent, usually by heating the solvent. Phosgene is dissolved in an inert solvent which has been cooled to about 0° C. The heated benzidine solution is then added to the phosgene solution at such a rate as to maintain the reaction temperature below 50° C., and preferably below 35° C. The time necessary to add the benzidine solution to the phosgene solution is not critical so long as the temperature does not exceed 50° C. At temperatures above this, it is difficult to keep the necessary amount of phosgene in solution and the danger of decomposition of the complex, as shown in Equation 2 above, is increased. If the complex decomposes before all the benzidine has been added, the yield of 4,4' biphenyl diisocyanate is reduced because of the formation of the urea as shown in Equation 3 above. The benzidine solution should be added to the phosgene solution in such a manner that the opportunity for reaction shown by Equation 1 is practically instantaneous, and efficient means of removing the heat of reaction must be provided to prevent the formation of locally overheated areas which would result in the release of the isocyanate groups, as shown in Equation 2 above. Consequently, the success of the procedure will depend upon the provision of an efficient means of agitation and an efficient means of cooling the reaction mixture.

After all the benzidine solution has been added, the reaction mixture is heated to drive off HCl as shown in Equation 2 above, leaving the diisocyanate in solution. The diisocyanate may then be recovered from solution by filtration and crystallization procedures familiar to those skilled in the art.

The solvent used in the operation may be any inert solvent, by which term is meant any solvent for benzidine and phosgene which will not enter into nor affect the reaction between benzidine and phosgene. Usually it is advisable to use the same solvent for the benzidine as is used for the phosgene. Solvents which have been found to work satisfactorily are chlorobenzene, o-dichlorobenzene, toluene, xylene, and tetrahydronaphthalene. Of these, chlorobenzene and o-dichlorobenzene are preferred because benzidine is more readily dissolved in these solvents.

The temperature to which the benzidine solution should be heated depends upon the solubility of benzidine in the particular solvent used. In general, temperatures from 80 to 100° C. have been found satisfactory. The concentration of benzidine in solution should be controlled between 2 grams and 25 grams of benzidine per 100 milliliters of solvent in the final reaction mixture. Economic use of the solvent determines the minimum concentration while the percentage yield is unduly decreased if the concentration exceeds the recommended maximum. Higher concentrations result in decreased yields because the more concentrated benzidine solutions result in a viscous reaction mixture which is difficult to agitate. Decreased efficiency in agitation has been found to result in decreased conversion yields. The preferred range of concentration is from 8 grams to 12 grams of benzidine per 100 milliliters of solvent in the final reaction mixture.

The amount of phosgene in the reacting mixture should be sufficient to complete the reaction with the incoming benzidine. Usually a molar excess of from 5% to 10% phosgene is employed to drive the reaction to completion.

After all the benzidine solution has been added to the phosgene solution, the reaction mixture is heated to drive off HCl as shown by Equation 2. For most efficient operation this step should be carried out at the reflux temperature of the solvent. Additional phosgene is usually added during this heating step to aid in driving the reaction to completion. After the HCl has been removed from solution, the diisocyanate may be isolated by any one of several known methods. For example, the solution containing the diisocyanate is permitted to cool to room temperature. A filter aid such as diatomaceous earth is added to the solution which is then filtered to remove the relatively insoluble impurities. The filtered solution is then concentrated to about 45 to 60% solids by weight by heating the solution at a temperature between 75° C. and 85° C. under vacuum. Higher temperatures are to be avoided due to the tendency of 4,4′ biphenyl diisocyanate to self-polymerize. The concentrated solution is then cooled to yield diisocyanate crystals. The crystals may be separated from the mother liquor and further purified, if necessary, by methods familiar to those skilled in the art.

The practice of the invention is illustrated by the following examples.

Example 1

Five hundred twenty-five grams of phosgene were dissolved in one liter of chlorobenzene and chilled to −10 to 0° C. Three hundred ninety-one grams of benzidine were dissolved in 2.53 liters of chlorobenzene at 80 to 90° C. The hot benzidine solution was then added in a continuous stream over a period of 75 minutes to the phosgene solution with rapid stirring of the reaction mixture. The temperature of the reaction mixture was not permitted to exceed 30° C. A heavy slurry of the phosgene/benzidine complex formed which was then decomposed to give the diisocyanate by slowly heating to reflux. As the reacted mixture was being heated, 310 grams of phosgene were bubbled through it. When the decomposition reaction was complete, as noted by the disappearance of the solid and absence of HCl in the exit gases, the solution was cooled to 100° C. Forty grams of diatomaceous earth were added to the solution which was then filtered. The filtrate was freed of phosgene and found to contain 467 grams of 4,4′ biphenyl diisocyanate, indicating a conversion of 94.3%. The solution was concentrated to 890 grams under reduced pressure. Upon cooling, the diisocyanate crystallized. The crystals were filtered off and dried. The yield of dried crystals was 415 grams or 83.6% of theory. Purity of the dried crystals was determined to be 98.2%.

Example 2

Five hundred grams of phosgene were dissolved in 1 liter of o-dichlorobenzene at 0° C. Three hundred sixty grams of benzidine were dissolved in 2.5 liters of o-dichlorobenzene at 80 to 90° C. The hot benzidine solution was added to the phosgene solution over a period of 40 minutes with rapid stirring. The temperature of the reaction mixture was not permitted to exceed 30° C. A slow stream of phosgene was passed into the slurry as it was slowly heated to 175° C., at which time the decomposition of the complex was complete. The reaction mixture was then cooled to 60° C. Forty grams of diatomaceous earth were added to the reacted mixture which was then filtered. The filtrate was freed of phosgene and found to contain 437 grams of 4,4′ biphenyl diisocyanate, which amount represented a conversion of 94.7%. The solution was concentrated under reduced pressure. Two crops of crystals were obtained. The total yield from the two crops was 367 grams, or 83% of theory. The average purity of the two crops was determined to be 98%.

Example 3

One hundred fifty-nine grams of phosgene were dissolved in 0.9 liter of chlorobenzene, chilled to 0° C. Seventy-nine grams of benzidine were dissolved in 2.25 liters of chlorobenzene at 80° C. The hot benzidine solution was added to the phosgene solution with rapid agitation, at such a rate that the temperature of the reaction mixture did not exceed 30° C. Approximately 20 minutes were required to add the benzidine solution. The resulting slurry was heated to reflux over a period of four hours with a slow stream of phosgene being added. After cooling the reacted mixture to room temperature, 20 grams of diatomaceous earth were added, and the solution was filtered. The filtrate was freed of phosgene and found to contain 101.7 grams of 4,4′ biphenyl diisocyanate, which amount represented a conversion of 99.9%.

While certain representative embodiments and details have been shown for the purpose of illustrating the invention, it will be apparent to those skilled in this art that various changes and modifications may be made therein without departing from the spirit or scope of the invention.

I claim:

1. A method for the conversion of benzidine to 4,4′ biphenyl diisocyanate which comprises adding a solution of benzidine in an inert solvent, said benzidine being completely dissolved in said solvent by heating and being present in the solvent in a concentration ranging from 2 grams to 25 grams per 100 milliliters of solvent in the final reaction mixture, to a solution of phosgene in an inert solvent, maintaining the temperature of the reacting mixture below 50° C. until all the benzidine solution has been added to the phosgene solution, and then heating the reaction mixture to drive off hydrogen chloride.

2. A method for the conversion of benzidine to 4,4′ biphenyl diisocyanate which comprises adding a solution of benzidine in an inert solvent, said benzidine being completely dissolved in said solvent by heating and being present in the solvent in a concentration ranging from 2 grams to 25 grams per 100 milliliters of solvent in the final reaction mixture, to a solution of phosgene in an inert solvent, maintaining the temperature of the reacting mixture below 35° C. until all the benzidine solution has been added to the phosgene solution, and then heating the reaction mixture to drive off hydrogen chloride.

3. A method for the production of 4,4' biphenyl diisocyanate which comprises adding a solution of benzidine in an inert solvent, said benzidine being completely dissolved in said solvent by heating and being present in the solvent in a concentration ranging from 2 grams to 25 grams per 100 milliliters of solvent in the final reaction mixture, to a solution of phosgene in an inert solvent, maintaining the temperature of the reacting mixture below 50° C. until all the benzidine solution has been added to the phosgene solution, heating the reaction mixture to drive off hydrogen chloride and recovering from solution the 4,4' biphenyl diisocyanate.

4. A method for the conversion of benzidine to 4,4' biphenyl diisocyanate which comprises adding a solution of benzidine in chlorobenzene, said benzidine being completely dissolved in said chlorobenzene by heating and being present in a concentration ranging from 2 grams to 25 grams per 100 milliliters of chlorobenzene in the final reaction mixture, to a solution of phosgene in chlorobenzene, maintaining the temperature of the reacting mixture below 50° C. until all the benzidine solution has been added to the phosgene solution, and then heating the reaction mixture to drive off hydrogen chloride.

5. A method for the conversion of benzidine to 4,4' biphenyl diisocyanate which comprises adding a solution of benzidine in o-dichlorobenzene, said benzidine being completely dissolved in said o-dichlorobenzene by heating and being present in a concentration ranging from 2 grams to 25 grams per 100 milliliters of o-dichlorobenzene in the final reaction mixture, to a solution of phosgene in o-dichlorobenzene, maintaining the temperature of the reacting mixture below 50° C. until all the benzidine solution has been added to the phosgene solution, and then heating the reaction mixture to drive off hydrogen chloride.

6. A method for the conversion of benzidine to 4,4' biphenyl diisocyanate which comprises adding a solution of benzidine in an inert solvent, said benzidine being completely dissolved in said solvent by heating and being present in the solvent in a concentration ranging from 8 grams to 12 grams per 100 milliliters of solvent in the final reaction mixture, to a solution of phosgene in an inert solvent, maintaining the temperature of the reacting mixture below 50° C. until all the benzidine solution has been added to the phosgene solution, and then heating the reaction mixture to drive off hydrogen chloride.

7. A method for the production of 4,4' biphenyl diisocyanate which comprises adding a solution of benzidine in an inert solvent, said benzidine being completely dissolved in said solvent by heating and being present in the solvent in a concentration of about 10 grams per 100 milliliters of solvent in the final reaction mixture, the temperature of said benzidine solution being between about 80° C. to 100° C., to a solution of phosgene in an inert solvent, maintaining the temperature of the reacting mixture below 35° C. until all the benzidine solution has been added to the phosgene solution, heating the reaction mixture to drive off hydrogen chloride and separating the 4,4' biphenyl diisocyanate from the solution.

8. A method for the conversion of benzidine to 4,4' biphenyl diisocyanate which comprises adding a solution of benzidine in an inert solvent, said benzidine being completely dissolved in said solvent by heating and being present in the solvent in a concentration ranging from 2 grams to 25 grams per 100 milliliters of solvent in the final reaction mixture, to a solution of phosgene in an inert solvent, providing means for continuous efficient agitation of the reacting mixture, maintaining the temperature of the reacting mixture below 50° C. until all the benzidine solution has been added to the phosgene solution, and then heating the reaction mixture to drive off hydrogen chloride.

9. A method for the conversion of benzidine to 4,4' biphenyl diisocyanate which comprises adding a solution of benzidine in an inert solvent, said benzidine being completely dissolved in said solvent by heating and being present in the solvent in a concentration ranging from 8 to 12 grams per 100 milliliters of solvent in the final reaction mixture, to a solution of phosgene in an inert solvent, providing means for continuous efficient agitation of the reacting mixture, maintaining the temperature of the reacting mixture below 50° C. until all the benzidine solution has been added to the phosgene solution, and then heating the reaction mixture to drive off hydrogen chloride.

ERNEST E. FAUSER.

References Cited in the file of this patent

UNITED STATES PATENTS

| Number | Name | Date |
| --- | --- | --- |
| 2,362,648 | Lichty | Nov. 14, 1944 |

OTHER REFERENCES

De Bell et al.: German Plastics Practice (1946), pp. 300–303.

Bayer: B. I. O. S. Report No. 719 (received by Patent Office March 12, 1948, pp. 1–3).